W. E. SHARP.

ANGLE COCK SUPPORT AND LOCK FOR AIR BRAKE SYSTEMS.

APPLICATION FILED AUG. 16, 1909.

Reissued Oct. 26, 1909. 13,029.

Witnesses
Geo. C. Davison
Maurice Goldberger.

Inventor:
William E. Sharp
By Luthicum Belt & Fuller
Attys.

UNITED STATES PATENT OFFICE.

WILLIAM E. SHARP, OF CHICAGO, ILLINOIS, ASSIGNOR OF ONE-HALF TO GEORGE B. ROBBINS, OF HINSDALE, ILLINOIS.

ANGLE-COCK SUPPORT AND LOCK FOR AIR-BRAKE SYSTEMS.

13,029. Specification of Reissued Letters Patent. Reissued Oct. 26, 1909.

Original No. 927,686, dated July 13, 1909, Serial No. 478,236. Application for reissue filed August 16, 1909. Serial No. 513,166

*To all whom it may concern:*

Be it known that I, WILLIAM E. SHARP, a citizen of the United States, residing at Chicago, in the county of Cook and State of Illinois, have invented certain new and useful Improvements in Angle-Cock Supports and Locks for Air-Brake Systems, of which the following is a specification.

This invention relates to the general art of air-brakes for railway cars, and has reference more particularly to a new and improved device for supporting and locking the usual angle-cock which couples the train-pipe to the brake-hose in a fixed position. The Master Car Builders' standards for the application of air-brake pipes to freight cars require: (1) that the center line of the train-pipe shall be a specified distance from the center line of the coupler of the car; (2) that the transverse center line of the angle-cock shall be a specified distance from the face of the coupler; ~~and~~ (3) that the angle-cock shall be set at a specified angle from a perpendicular line, so as to prevent kinking of the brake-hose when they are coupled up. It is important that the train-pipe be not only made to meet these conditions, but that it be securely attached to the car in a manner to prevent its shifting and breaking the couplings when cars are being switched. A broken or leaky air-brake pipe is a serious defect in railway operation, and is usually the result of a pipe shifting when the cars are bumped. In fact, the majority of the train-line failures are due to this defect, which results from the pipes not being securely fastened to the car.

To avoid the faults hereinabove specified, and to provide a device wherein the specified angularity of the angle-cock shall always be maintained, constitute the chief objects of the present invention, which are attained in a device embodying the constructional characteristics and features of that shown in the accompanying drawing, in which,—

Figure 1:
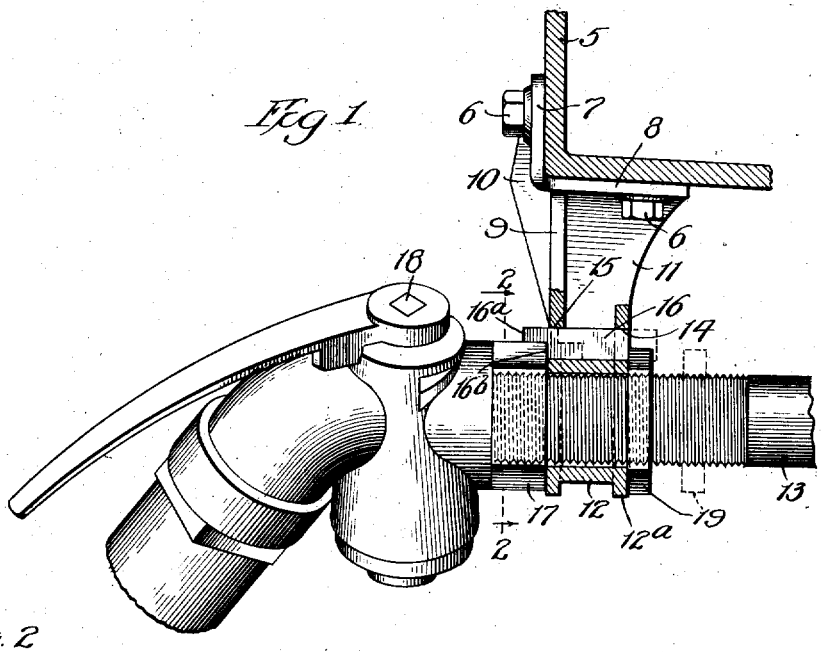
Figure 2:
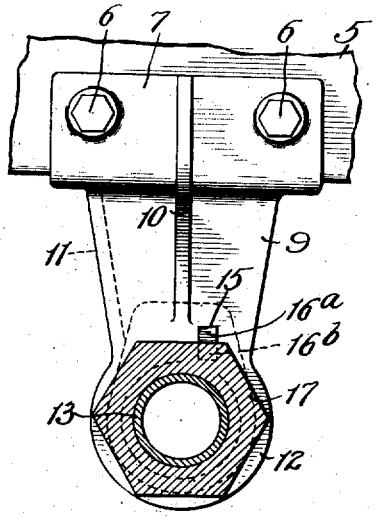
Figure 3:
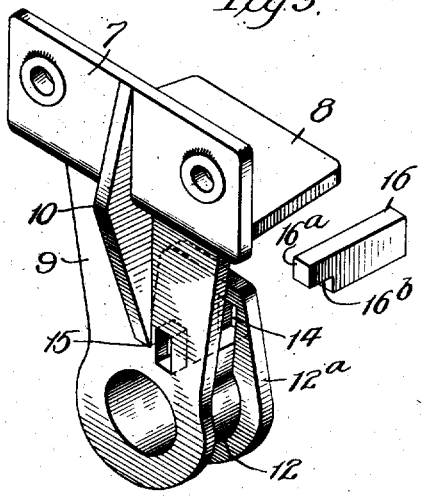

Figure 1 is a side elevational view of my improved device, partly in vertical section, showing the manner in which the same is attached to the end sill of a car. Fig. 2 is a view partly in front elevation and partly in vertical section on the line 2—2 of Fig. 1. Fig. 3 is a perspective view of the train-pipe bracket, detached, with the locking key withdrawn.

Referring to the drawings, 5 designates the end channel or any other form of end sill of a car, to which is rigidly attached, as by screw-bolts 6, my improved train-pipe bracket, herein shown as comprising vertical and horizontal attachment-plates 7 and 8, respectively, a depending body-plate 9 having front and rear reinforcing ribs 10 and 11, respectively, disposed at right angles thereto, and, at its lower end, a cylindrical portion 12 which constitutes a bearing and support for the forward threaded end of the train-pipe 13. The cylindrical portion 12 has on its rear end a flange $12^a$; and this latter, as also the plate 9, are formed with registering rectangular apertures 14 and 15, respectively, which are adapted for the reception of a locking key 16. The forward end of this latter is undercut or notched, as shown, thus forming a locking projection $16^a$ that is adapted to overlie one of the sides of the polygonal coupling member 17 of the usual ~~angle-cock~~ designated as an entirety by 18, and a shoulder $16^b$ that is designed to abut against the contiguous face of said coupling member; the locking key being confined in locking position by a nut 19 on the threaded end of the train-pipe 13; said nut screwing up hard against the face of the flange $12^a$ of the bracket and, in such position, abutting against the rear end of the locking key, as clearly shown in Fig. 1, confining said key against endwise movement between said nut and said coupling member. In this position the projection $16^a$ of the key, overlying and contacting with one of the polygonal faces of the coupling member, locks said coupling member against turning in either direction, and this maintains the angle-cock in its fixed and correct position.

The supporting bracket, constructed as shown and described, is comparatively light, and yet affords a perfectly ~~rigid~~ support for the end of the train-pipe and the angle-cock, and possesses a high degree of strength to resist lateral strains occurring in a direction either longitudinally of or transverse to the train-pipe. The device does not interfere with the ready application or uncoupling of the angle-cock, since for this it is necessary only to back off the nut 19 and retract the locking-key sufficiently to withdraw its nose $16^a$ from over the coupling member 17 as indicated in dotted lines in Fig. 1. It may also be noted that the locking key not only maintains the angle-cock in fixed angular position, but it also constitutes in effect a nut-lock preventing any accidental unscrewing or uncoupling of the angle-cock, thus insuring its operative connection with the train-pipe when in service.

While I have herein illustrated and described one embodiment of the invention as having the train-pipe support in the form of a bracket depending from the car end-sill, it is to be understood that in some types of cars, such as tank cars, the train-pipe is passed through an aperture or perforation in the end-sill, and in such cases the support is made of suitable shape for coöperation with such end-sill, and would not take the form of a depending bracket, which is ordinarily used only when the pipe is below the sill. It is desirable, however, though not absolutely necessary, that the two apertures or perforations for the train-pipe and locking key, respectively, shall be in the support, so that the distance between their centers may be definitely fixed and unvariable.

I claim:

1. In a device of the character described, the combination of a train-pipe, a support mounted on the car-frame and having a bearing for said pipe, a pair of threaded members coöperating with said pipe and adapted to be screwed against opposite sides of said support to maintain said pipe against displacement, and a locking key co-acting with one of said members and preventing rotation of the same in the direction of release, substantially as described.

2. A train-pipe support and angle-cock lock comprising in combination with the threaded end of the train-pipe a support therefor, an angle-cock having threaded connection with said train-pipe and bearing against one side of said support, a lock-nut threaded on the pipe and bearing against the opposite side of said support, and a locking member engaging the angle-cock and engaged by the lock-nut, substantially as described.

3. In a train-pipe support and angle-cock lock, the combination of a train-pipe, a support having a bearing for said train-pipe, an angle-cock threaded on said train-pipe and bearing against one face of said support, a locking nut having threaded engagement with said train-pipe and adapted to abut against the opposite side of said support, the coöperation of said angle-cock and locking nut with said support preventing displacement of the train-pipe, and a locking key extended through an aperture of said support and locking said angle-cock against rotation in the direction of release, said locking nut coöperating with said key to maintain the same in locking relation with said angle-cock, substantially as described.

4. An angle-cock support and train-pipe connection comprising a bracket adapted to be secured to and depend from the end-sill of a car and having an aperture for the passage of the train-pipe, in combination with a train-pipe having a threaded end passing through said aperture, an angle-cock having a threaded connection with said end and bearing against the front of said bracket, and a locking nut threaded on the train-pipe and bearing against the opposite side of said bracket, substantially as described.

5. A support for the end of a train-pipe, comprising a bracket having at its upper end attachment-plates adapted to be secured to the front and under side of the end-sill of a car, and a depending portion having formed in its lower end a cylindrical bearing for the end of the train-pipe.

6. A support for the end of a train-pipe, comprising a bracket having at its upper end attachment-plates adapted to be secured to the front and under side of the end-sill of a car, a depending flat body-portion having reinforcing ribs disposed in a plane at right angles thereto, and a cylindrical bearing for the end of the train-pipe at the lower end of said body-portion.

7. A combined train-pipe support and angle-cock lock, comprising a bracket adapted to be secured to and depend from the end-sill of a car and having a bearing for the end of a train-pipe, and a locking key mounted in said bracket and adapted to engage and lock the angle-cock coupling in position on the end of said train-pipe.

8. A combined train-pipe support and angle-cock lock, comprising a bracket adapted to be secured to and depend from the end-sill of a car and having a bearing for the end of a train-pipe, a locking key mounted in said bracket and adapted to engage and lock the angle-cock coupling in position on the end of said train-pipe, and means for removably confining said locking key in operative position.

9. A combined train-pipe support and angle-cock lock, comprising a bracket adapted to be secured to and depend from the end-sill of a car, said bracket having a bearing formed therein for the end of a train-pipe and, to one side of said bearing, an aperture, a locking key slidably mounted in said aperture and having a forward end adapted to project over one side of the polygonal coupling member of an angle-cock; and a nut on the train-pipe adapted to engage the rear end of said locking key and maintain the latter in operative position.

WILLIAM E. SHARP.

Witnesses:
WALTER M. FULLER,
ELIZABETH MOLITOR.